US008234389B2

(12) United States Patent
Kezuka et al.

(10) Patent No.: US 8,234,389 B2
(45) Date of Patent: Jul. 31, 2012

(54) COMMUNICATION CONTROL METHOD AND COMMUNICATION CONTROL UNIT CONTROLLING NETWORK CONNECTION STATUS AMONG COMMUNICATION UNITS

(75) Inventors: Osamu Kezuka, Kahoku (JP); Kazuho Kitazawa, Kahoku (JP); Yasuo Ishiwata, Kahoku (JP); Masaru Sakurai, Kahoku (JP); Sadayuki Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 12/026,984

(22) Filed: Feb. 6, 2008

(65) Prior Publication Data
US 2008/0215724 A1    Sep. 4, 2008

(30) Foreign Application Priority Data

Feb. 14, 2007    (JP) ................................. 2007-033969

(51) Int. Cl.
*G06F 15/16* (2006.01)
(52) U.S. Cl. ...................................... 709/229; 709/225
(58) Field of Classification Search .................. 709/225, 709/229; 713/300, 330, 340
See application file for complete search history.

(56) References Cited

U.S. PATENT DOCUMENTS

| | | | |
|---|---|---|---|
| 5,784,633 A * | 7/1998 | Petty ............................... | 710/60 |
| 6,034,963 A | 3/2000 | Minami et al. | |
| 6,760,769 B2 | 7/2004 | Jayam et al. | |
| 6,889,321 B1 * | 5/2005 | Kung et al. .................... | 713/153 |
| 6,981,014 B2 | 12/2005 | Jayam et al. | |
| 7,096,247 B2 | 8/2006 | Jayam et al. | |
| 7,149,892 B2 * | 12/2006 | Freed et al. .................... | 713/151 |
| 7,162,630 B2 | 1/2007 | Sperry et al. | |
| 2003/0165160 A1 | 9/2003 | Minami et al. | |
| 2003/0172264 A1* | 9/2003 | Dillon ............................ | 713/160 |
| 2004/0062267 A1 | 4/2004 | Minami et al. | |
| 2007/0162981 A1* | 7/2007 | Morioka et al. ................ | 726/30 |
| 2008/0089248 A1* | 4/2008 | Ushiyama et al. ............ | 370/256 |

FOREIGN PATENT DOCUMENTS

| | | |
|---|---|---|
| JP | 2005-503699 | 2/2005 |
| JP | 2005-529523 | 9/2005 |
| WO | WO 03/021443 A1 | 3/2003 |
| WO | WO 03/105011 A1 | 12/2003 |

\* cited by examiner

*Primary Examiner* — David Lazaro
*Assistant Examiner* — Marie Georges Henry
(74) *Attorney, Agent, or Firm* — Staas & Halsey LLP

(57) ABSTRACT

A communication control method is provided for an encryption processing unit connected to a connection status acquiring unit which is connected to a circuit that transmits packets on a network and acquires the status of a connection to a network for an encrypting device for encrypting the packet, and connected to an expansion card for connecting to the network, based on the network connection status requested and acquired from the connection status acquiring unit by the expansion card each prescribed period of time, by relaying and acquiring the network connection status from the connection status acquiring unit and forcibly notifying the expansion card that the connection status is connected and/or not connected, according to a requirement/criteria.

4 Claims, 6 Drawing Sheets

COMMUNICATION CONTROL METHOD AND COMMUNICATION CONTROL UNIT CONTROLLING NETWORK CONNECTION STATUS AMONG COMMUNICATION UNITS

CROSS-REFERENCE TO RELATED APPLICATIONS

This application is related to and claims priority to Japanese patent application no. 2007-33969 filed on Feb. 14, 2007 in the Japan Patent Office, and incorporated by reference herein.

BACKGROUND

Field

The embodiment methods and units relate to controlling communication for an encrypting unit and a communication control unit used in (or by) an encrypting unit.

SUMMARY

Conventionally, there has been high demand for security countermeasures using encrypted transmissions in order to ensure the safety of communication in the communication field that uses IP (Internet protocol). Currently known encryption communication include application level encryption communication such as SSL (Secure Socket Layer) and PGP (Pretty Good Privacy) as well as IP layer level encryption communication such as IPSec (IP Security Protocol). For example, IPSec ensures communication safety by encrypting all packets before transmitting.

IP Sec is generally carried out on the hardware level because the burden on the host processor will be high if IPSec is carried out on a software level.

The simplest method of constructing IPSec dedicated hardware is to connect a dedicated LSI (IP Sec card) for encryption processing between an expansion card (NIC: Network Interface Card) for connecting to a network and a circuit that transmits packets on a network, using an ETHERNET interface.

Specifically, as shown in FIG. 6A, an IPSec is constructed by integrating and connecting an "IPSec card" between a "TOE/NIC" that contains a TOE (TCP/IP offload engine), which is a processor that performs TCP/IP communication functions in place of a CPU (Central Processing Unit) in an NIC, and a "Trans", which is a circuit (LAN cable) that transfers packets on a network, using a GMII (Gigabit Medium Independent Interface) via a "PHY" that performs parallel-serial and serial-parallel conversion of data and monitors the data communication status (refer to the dashed line shown in FIG. 6A).

Furthermore, connecting a "TOE/NIC", an "IPSec card" and a "PHY" in series using a "GMII" as shown in FIG. 6B is effective for reducing the number of components in order to achieve an expansion card that includes an encrypting function as a single unit.

Incidentally, if an expansion card that contains an encrypting function is achieved in a single unit using conventional technology, there will be problems with the construction shown in FIG. 6B concerning how to control the MDIO (Management Data Interface) and the MDC (Management Data Clock) which is the management I/F that acquires the data communication status and the like from the "PHY" for the "TOE/NIC" and the "IPSec card".

In other words, with the construction shown in FIG. 6A or the construction shown in FIG. 6B, when initialization is performed when the power is turned on, the "IPSec card" will be controlled from "TOE/NIC" via the GMII, so a state of communication must always be present between the "TOE/NIC" and the "IPSec card". However, with the construction shown in FIG. 6A or 6B, if for example a LAN cable is not connected to the "Trans" when the power is turned on, the "TOE/NIC" will determine that the "network is not connected" from the information that the MDC/MDIO acquires from the "PHY", and therefore the "IPSec card" will not be initialization controlled.

Additionally, during network disturbances where a "network not connected" condition occurs, for example, the "TOE/NIC" will continue to transmit packets to the "IPSec card", so the information that the "network is not connected" must be sent to the "TOE/NIC", and after recovery from the network disturbances, the "TOE/NIC" must be in a condition that can immediately control the "IPSec card".

In other words, as described above, if an expansion card where encryption is performed based on information that the MDC/MDIO acquires from the "PHY" is constructed as a single unit using conventional technology, the processes of the "IPSec card" will not be smoothly performed by the "TOE/NIC" when the power is turned on or during network disturbances, and therefore there is a problem that only an encryption unit with low reliability can be achieved.

Therefore, according to an aspect of an embodiment, a communication controller and communication control method can achieve a highly reliable encryption unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

An embodiment of the communication control method and communication control unit according to the method and unit in the embodiments will be described below in detail while referring to the attached drawings. Note, a communication control unit constructed to include the communication control method according to the method and unit in the embodiment is described below as an embodiment. Furthermore, the processing procedures and construction of the communication control unit of embodiment 1 and the effects of embodiment 1 are described below in order, and similar to embodiment 1, the communication control unit according to embodiment 2 and the communication control unit according to embodiment 3 will also be described in order.

Embodiment 1

Explanation of Terminology

First, the main terminology that is used in the present embodiment will be explained. "TOE/NIC" as used in the embodiment shown below refers to a TOE (TCP/IP offload engine) which is a processor that performs the communication functions using TCP/IP in place of a CPU (Central Processing Unit) integrated into an expansion card (NIC: Network Interface Card) for connecting to a network, and corresponds to the "expansion card" referred to in the patent claims. Furthermore, an "IPSec card" is a dedicated LSI for performing encryptions using IPSec (IP Security Protocol) which encrypts and transmits all packets in order to ensure the safety of communication, and corresponds to the "encryption unit" shown in the scope of patent claims.

Additionally, "PHY" refers to a unit that performs parallel-serial and serial-parallel data conversion and monitors the status of data communication, and is a physical layer in an OSI (Open Systems Interconnection) reference model corresponding to the "connection status acquiring unit" in the patent claims.

Outline and Characteristics of Communication Control Unit for Embodiment 1

Figure 1A:
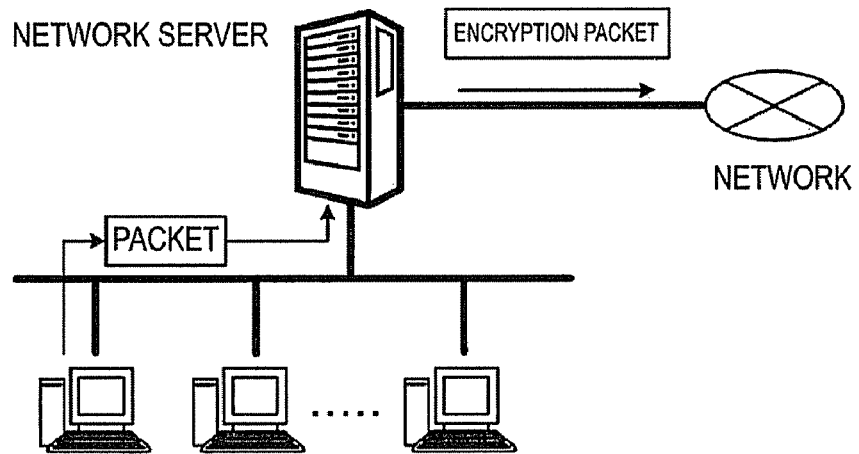
FIGS. 1A-1C are diagrams for explaining the characteristics' and outline of the communication control unit according to embodiment 1.
Figure 1B:
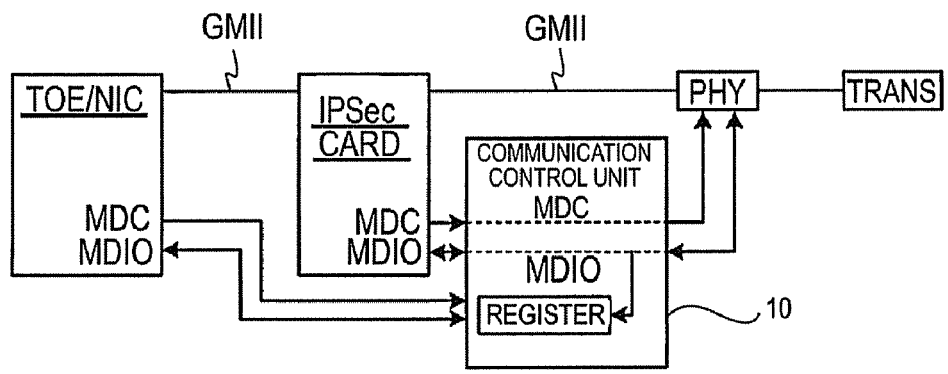
Figure 1C:
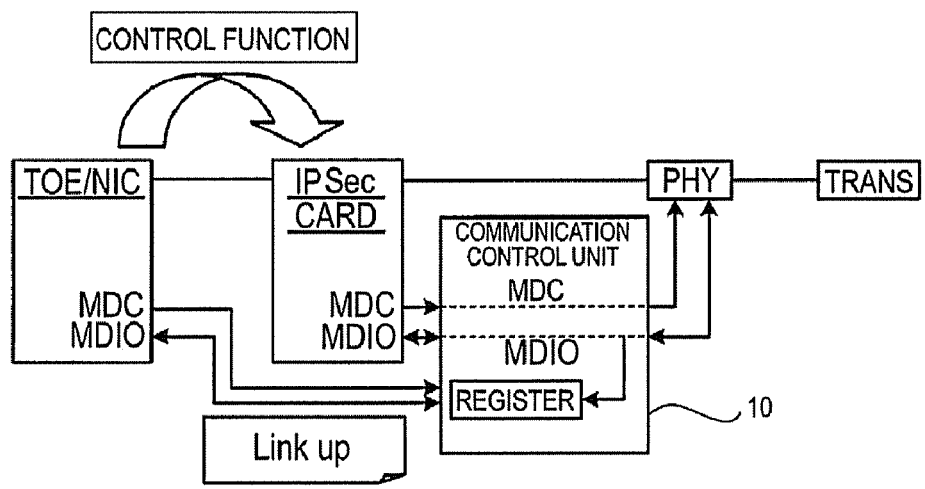

In the following, the main characteristics of the communication control unit of embodiment 1 will be described in detail using FIGS. 1A, 1B and 1C. FIGS. 1A-1C are diagrams for explaining the characteristics and outline of the communication control unit according to embodiment 1.

The communication control unit 10 of embodiment 1 is placed in a network server that provides encrypting functions for encrypting packets received from a transmitting terminal and transmitting the packets to a network (refer to FIG. 1A). Specifically, as shown in FIG. 1B, a "PHY" that is connected to a "Trans", which is a circuit that transmits packets on a network, and that acquires the network connection status of the "Trans", a communication control unit 10, an "IPSec card" for encrypting the packet, and a "TOE/NIC", which is an expansion card for connecting to a network, are placed on a network server (refer to FIG. 1A) together with an encrypting unit that is connected by a GMII (Gigabit Medium Independent Interface).

Furthermore, the main point of the communication control unit 10 of embodiment 1 is that the process of encrypting using a "IPSec card" is controlled based on the network connection status requested and acquired by the "TOE/NIC" from the "PHY" each prescribed period of time, and a major characteristic is that an encryption processing unit with high reliability can be achieved.

To simply describe the major characteristics, the communication control unit 10 of embodiment 1 relays and acquires the network connection status from the "PHY". In other words, as shown in FIG. 1B, when the "IPSec card" acquires the network connection status on "Trans" from "PHY" via the MDIO (Management Data Interface) and the MDC (Management Data Clock) which is the management I/F provided by the "IPSec card", the communication control unit will relay and acquire the network connection status. Specifically, the notification of the network connection status that has been provided to the MDIO of the "IPSec card" will be relayed and acquired each prescribed period of time designated by the MDC of the "IPSec card". More specifically, relaying and acquiring will be performed when the "Link up" information for the case where the network connection status is "connected", or the "Link down" information for the case where the network connection status is "unconnected" is provided to the "IPSec card" from the "PHY".

Furthermore, the communication control unit of embodiment 1 forcibly provides notification of "Connected: Link up" as the network connection status to the "TOE/NIC" for the case where the network connection status acquired is "not connected: Link down" at the time of request from the "TOE/NIC". Specifically, if the network connection status that is relayed and acquired is "Not connected: Link down" at the time that acquisition of the network connection status is requested at each prescribed period of time designated by the MDC of the "TOE/NIC", the communication control unit of embodiment 1 will provide to the MDIO of the "TOE/NIC" the fixed information of "Connected: Link up" maintained in the register shown in FIG. 1C (Refer to FIG. 1C).

Furthermore, the communication control unit of embodiment 1 provides notification that the network connection status is "Connected: Link up" for an encryption processing unit when the power is turned on. In other words, the communication control unit of embodiment 1 forcibly provides notification of "Connected: Link up" regardless of the "connection status" of the network when the power to the encryption processing unit is turned on. Note, the time when the power to the encryption processing unit is turned on is also when the power to the network server shown in FIG. 1A is turned on.

Therefore, by establishing the communication control unit of embodiment 1, the "TOE/NIC", which is an expansion card, will always communicate with the "IPSec card" and can control the "IPSec card", and therefore as shown in the major characteristics described above, a highly reliable encryption processing unit can be achieved.

Construction of Communication Control Unit of Embodiment 1

Figure 2:
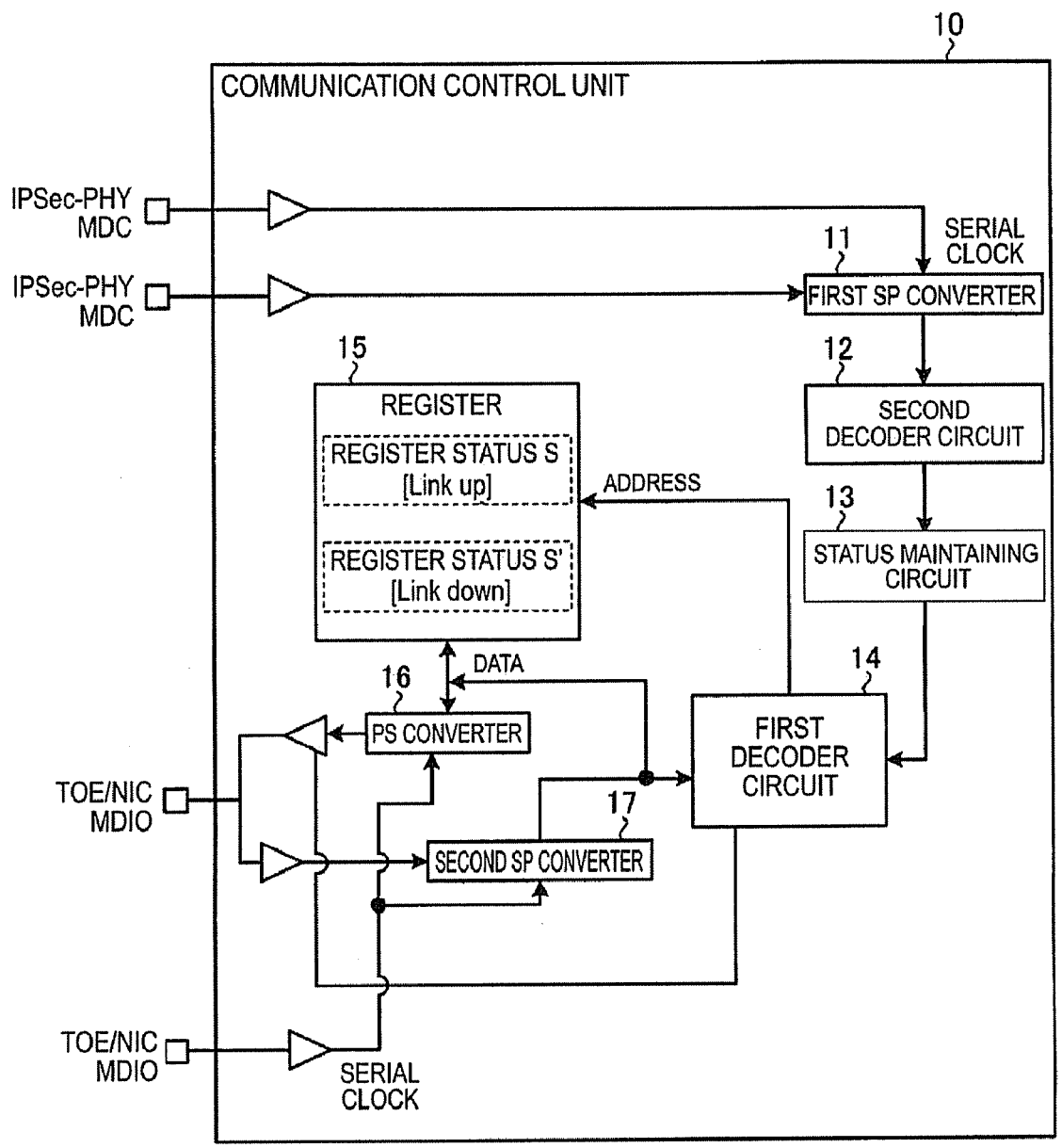
FIG. 2 is a block diagram showing the construction of a communication control unit according to embodiment 1.

Next, the communication control unit of embodiment 1 will be described using FIG. 2. FIG. 2 is a block diagram showing the construction of a communication control unit according to embodiment 1.

As shown in FIG. 2, the communication control unit 10 of embodiment 1 comprises a first SP converter 11, a second decoding circuit 12, a status maintaining circuit 13, a first decoding circuit 14, a register 15, a PS converter 16, and a second SP converter 17 as related components that are specifically connected to the main unit. Herein, the second decoding circuit 12 corresponds to the "relay and acquiring" shown in the scope of patent claims, and the first decoding circuit 14 corresponds to the "connection status notification" of the same.

The first SP converter 11 converts the "serial clock", which is the data designated by the MDC of the "IPSec card" each prescribed period of time, and the network connection status that is provided by the "PHY" from the MDIO of the "IPSec card" to parallel data.

The second decoding circuit 12 detects and acquires the network connection status acquired by the "PHY" each prescribed period of time from the parallel data converted by the first SP converter 11, and stores the acquired data in the status maintaining circuit 13, which will be described later. Specifically, the "Link up" information if the network connection status is "connected" or the "Link down" information if the network connection status is "unconnected" will be relayed and acquired when provided from the "PHY" to the "IPSec card".

The status maintaining circuit 13 records the network connection status that was detected by the second decoding circuit 12.

The second SP converter 17 converts the "serial clock", which is the data designated by the MDC of the "TOE/NIC" each prescribed period of time, and the acquisition request for the network connection status from the "PHY" that is requested by the MDIO of the "TOE/NIC" to parallel data.

The register 15 is a register that holds the data read by the MDC/MDIO control of the "TOE/NIC", and stores "status register S Link up" that designates "connected" as the network connection status or "status register S' Link down" that designates "unconnected" as the network connection status. Note, the register 15 also stores information (such as 100 Mbps compatible cable) about the circuit (LAN cable) that forms the "Trans" that is connected to the "PHY".

The first decoding circuit 14 decodes the register address of the register 15, and if the network connection status recorded in the status maintaining circuit 13 is unconnected when requested from the "TOE/NIC", the network connection status provided to the "TOE/NIC" will forcibly be notified as being connected, and therefore will be converted to the "status register S Link up" register address, and the information "connected: Link up" will be output from the register 15.

Additionally, the first decoding circuit 14 provides notification to the "TOE/NIC" that the network connection status is "connected: Link up" when the power to the encryption processing unit is turned on, and therefore fixedly converts to the register address of "status register S Link up" and outputs the information of "connected: Link up" from the register 15.

The PS converter 16 converts the parallel data output from the register 15 to serial data based on the register address that has been converted by the first decoding circuit 14, and provides notification to the MDIO of the "TOE/NIC".

Processing Procedures of Communication Control Unit of Embodiment 1

Figure 3:
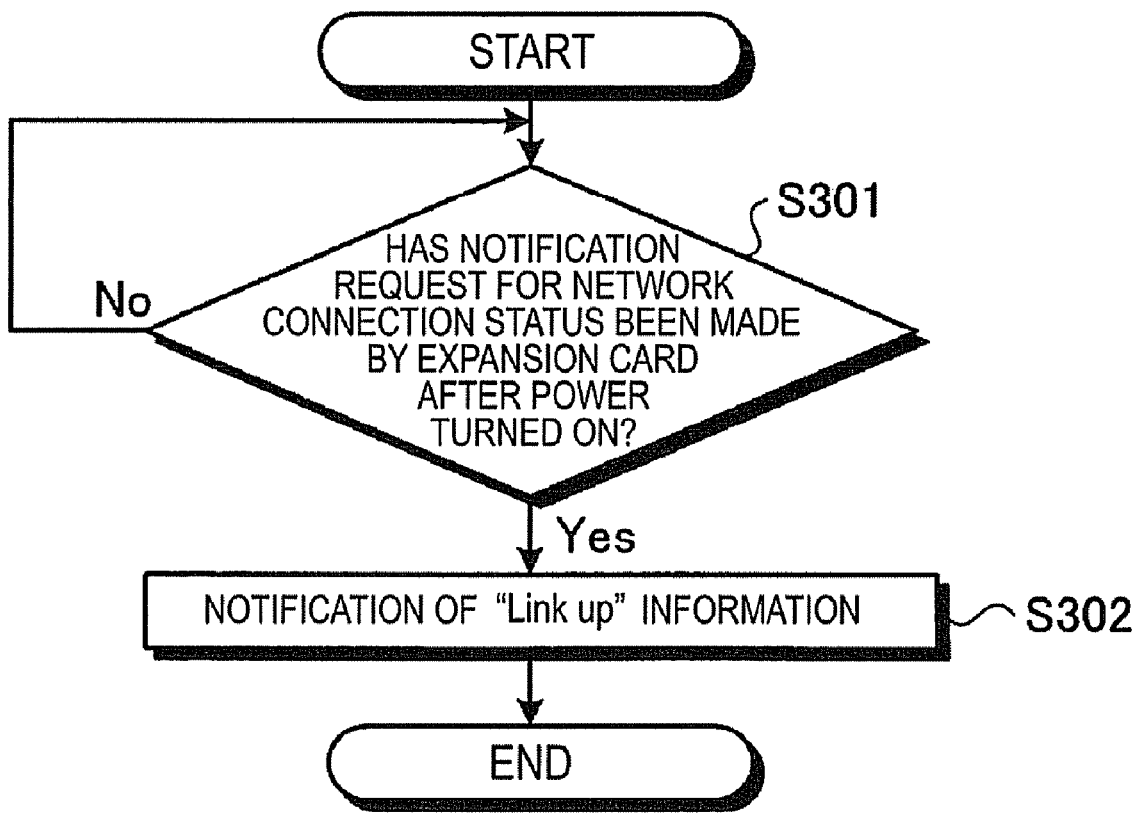
FIG. 3 is a diagram for explaining the processing procedure of the communication control unit according to embodiment 1.

Next, the process using the communication control unit 10 of embodiment 1 will be described using FIG. 3. FIG. 3 is a diagram for explaining the processing procedure of the communication control unit according to embodiment 1.

First, when the communication control unit 10 of embodiment 1 receives a notification request for the network connection status from the "TOE/NIC", which is an expansion card, after the power to the network server has been turned on (S301 positive), regardless of the network connection status detected and acquired by the second decoding circuit 12, the communication control unit 10 of embodiment 1 provides the "connected: Link up" information (S302) from the register 15 to the MDIO of the "TOE/NIC" based on the register address converted by the first decoding circuit 14, thus completing the process.

Effect of Embodiment 1

As described above, with embodiment 1, the network connection status is relayed and acquired from the "PHY", and if the acquired network connection status is unconnected when requested from the "TOE/NIC", which is the expansion card, a notification of "connected: Link up" will forcibly be provided as the network connection status to the "TOE/NIC", and therefore the "TOE/NIC" will always communicate with the "IPSec card" and can control the "IPSec card", for example (without limitation), for initialization, and thus a highly reliable encryption processing unit can be achieved.

Furthermore, with embodiment 1, the network connection status will be the notified to the "TOE/NIC" as being "connected: Link up" when the power to the encryption processing unit is turned on, and therefore the "TOE/NIC" will communicate with the "IPSec card" when the power is turned on, and initialization control of the "IPSec card" will be possible, and therefore a highly reliable encryption processing unit can be achieved. Furthermore, the "TOE/NIC" can perform initialization control of the "IPSec card" in response to network disturbances that occur when the power is turned on, and therefore a highly reliable encryption processing unit can be achieved.

Embodiment 2

With the aforementioned embodiment 1, the case where a notification of connected is forcibly provided as the network connection status to the expansion card was described, but in embodiment 2, the case where a notification of connected is provided as the network connection information after a notification of unconnected has once been provided to the expansion card during a network disturbance will be described.

Outline and Characteristics of Communication Control Unit for Embodiment 2

Figure 4A:
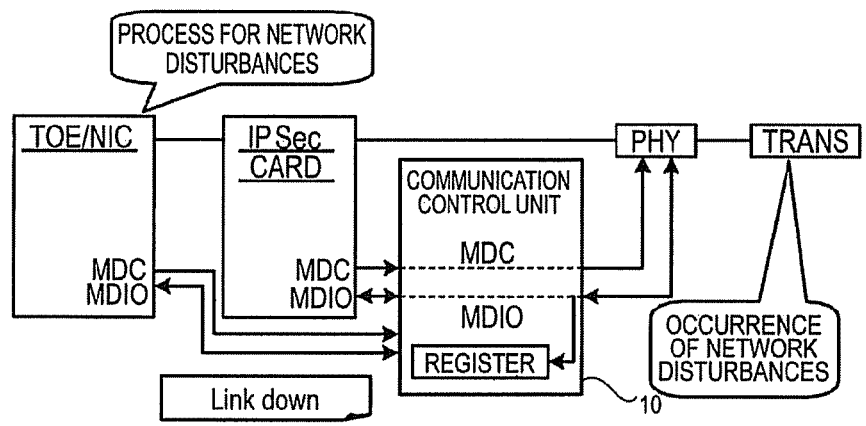
FIGS. 4A-4C are diagrams for explaining the characteristics and outline of the communication control unit according to embodiment 2.
Figure 4B:
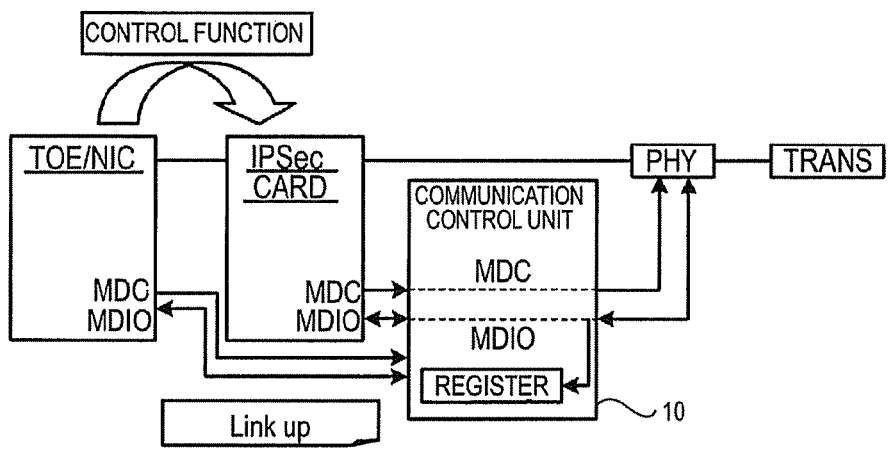
Figure 4C:
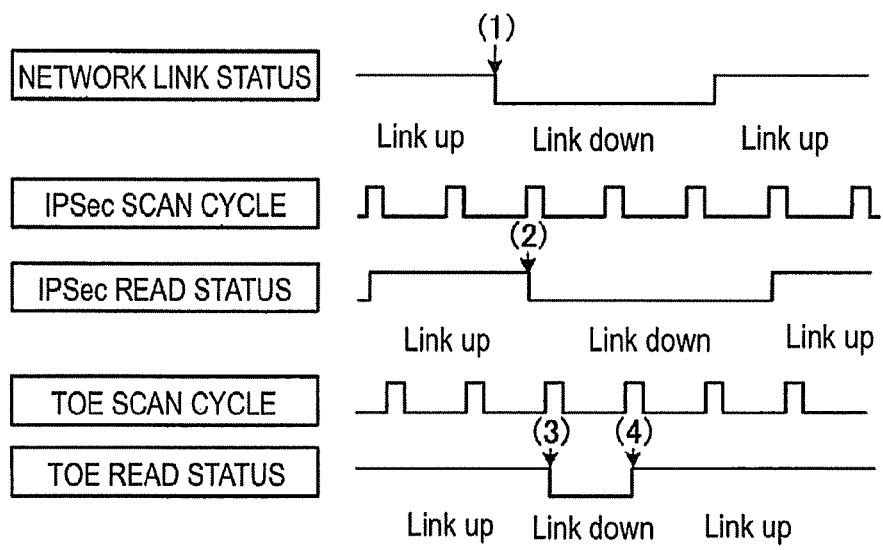

First, the main characteristics of the communication control unit of embodiment 2 will be described in detail using FIGS. 4A, 4B and 4C. FIG. 4A-4C are diagrams for explaining the characteristics and outline of the communication control unit according to embodiment 2.

The communication control unit of embodiment 2, similar to embodiment 1, relays and acquires the network connection status from the "PHY", but provides a notification of unconnected to the "TOE/NIC", which is an expansion card, when the acquired network connection status has changed from connected to unconnected.

In other words, as shown in FIG. 4A, if the "IPSec card" acquires the network connection status of the "Trans" from the "PHY" via the MDIO in accordance with the prescribed cycle of the MDC provided thereby when a network disturbance has occurred because the LAN cable was removed or the like (refer to arrow 1 in FIG. 4C), the communication control unit of embodiment 2 will provide notification of "unconnected: Link down" to the "TOE/NIC" in accordance with the cycle designated by the MDC of the "TOE/NIC" if the network connection status has changed from connected to unconnected (refer to arrow 2 of FIG. 4C), because the data that has been relayed and acquired has changed from "connected: Link up" to "unconnected: Link down" (refer to arrow 3 in FIG. 4C). Therefore, the "TOE/NIC" will perform processes such as temporary packet transmission standby or the like during a network disturbance.

Furthermore, the communication control unit of embodiment 2 provides notification that the network connection information is connected when requested by the "TOE/NIC" after a prescribed period of time has elapsed. In other words, as shown in FIG. 4B, the communication control unit of embodiment 2 forcibly provides notification of "connected: Link up" to the next notification request from the "TOE/NIC" (refer to arrow 4 of FIG. 4C).

Therefore, by establishing the communication control unit according to embodiments 2, the "TOE/NIC", which is an expansion card, will perform temporary packet transmission standby processes during a network disturbance, will again communicate with the "IPSec card", and can control the "IPSec card", and therefore a highly reliable encryption processing unit can be achieved.

Construction of Communication Control Unit of Embodiment 2

Next, the communication control unit of embodiment 2 will be described using FIG. 2. FIG. 2 is a block diagram showing the construction of a communication control unit according to embodiment 1. As shown in the figure, the communication control unit 10 of embodiment 2 has the same construction as the communication control unit 10 of embodiment 1, but the processing details of the first decoding circuit 14 differ. The details will be described below.

If the first decoding circuit 14 decodes the register address of the register 15, and the network connection status stored in the status maintaining circuit 13 has changed from connected to unconnected when requested from the "TOE/NIC", a notification that the network connection status is unconnected will be provided to the "TOE/NIC", and therefore as shown in FIG. 2, the register address will be converted to the register address of "status register S' Link down", and the information "unconnected: Link down" will be output from the register 15 (refer to arrow 3 of FIG. 4C).

Furthermore, when a request is made from the "TOE/NIC" after a prescribed period of time has elapsed, the first decoding circuit 14 will provide notification to the "TOE/NIC" that the network connection status is "connected: Link up", and therefore the register address will be converted to the register address of "status register S Link up" and the information of "connected: Link up" will be output from the register 15 (refer to arrow 4 in FIG. 4C).

Processing Procedures of Communication Control Unit of Embodiment 2

Figure 5:
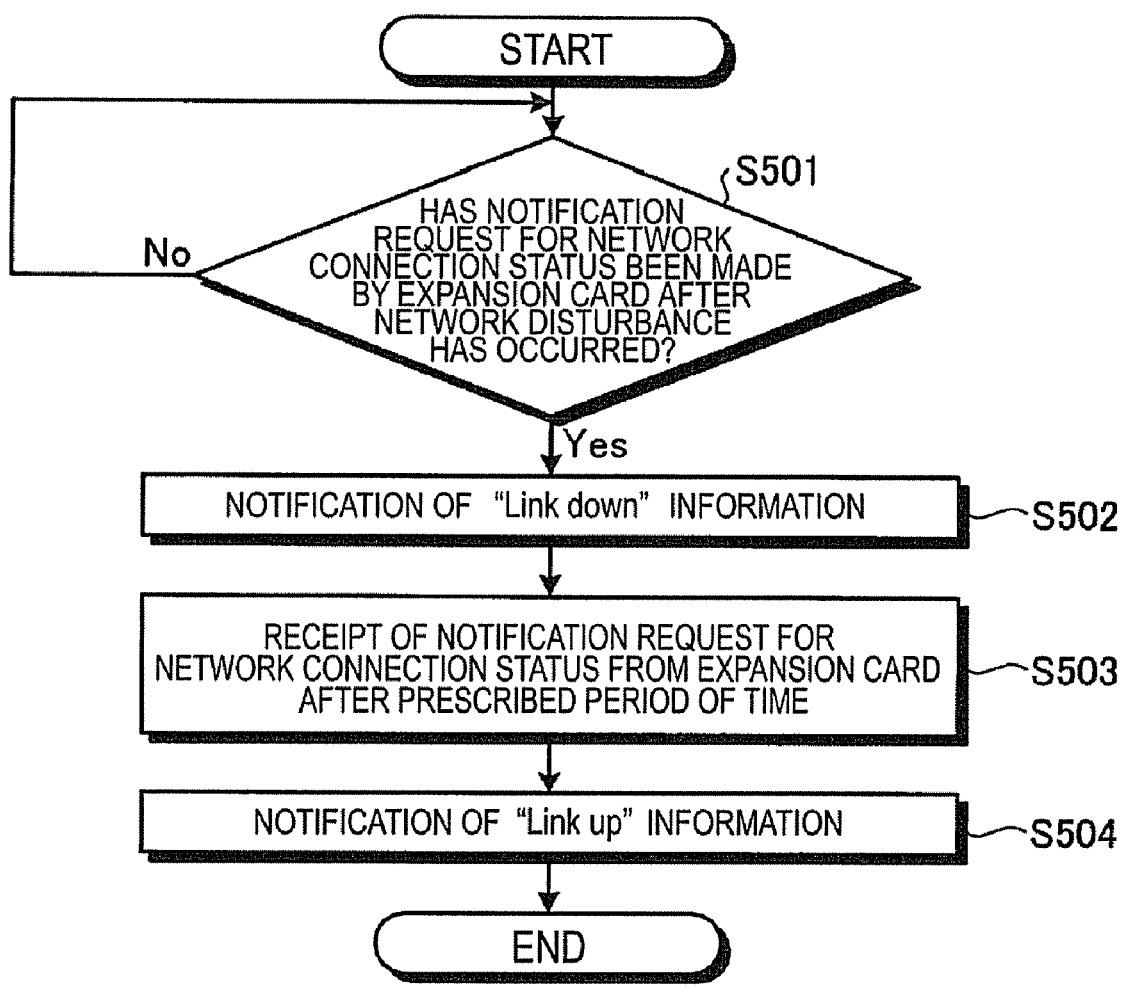
FIG. 5 is a diagram for explaining the processing procedure of the communication control unit according to embodiment 2.
Figure 6A:
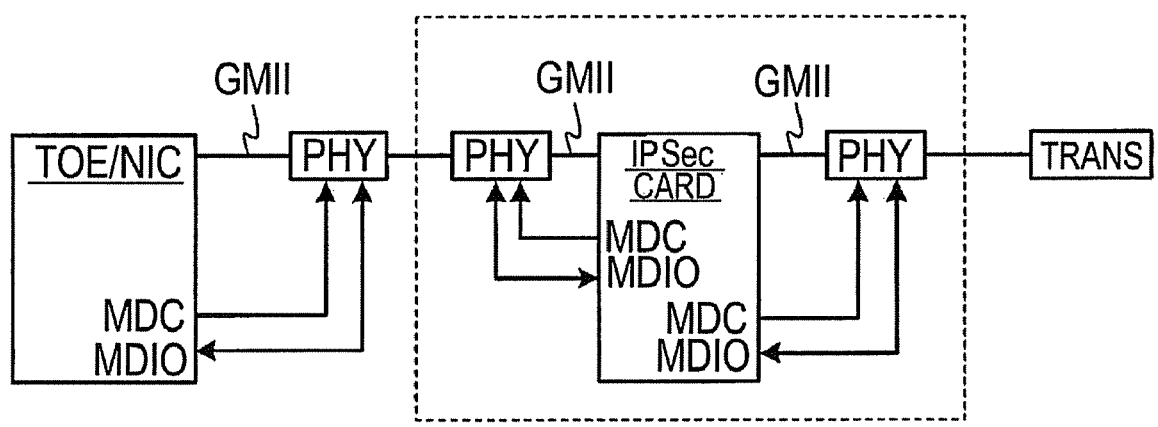
FIGS. 6A-6B are diagrams for explaining the problems with the conventional technology.
Figure 6B:
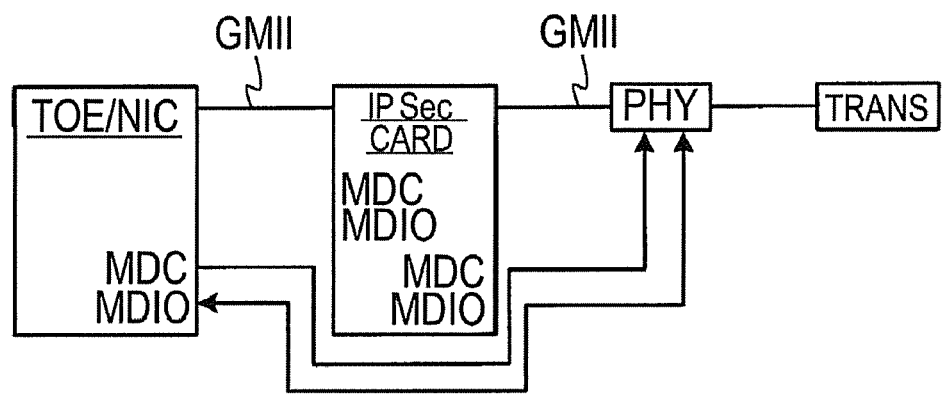

Next, the process using the communication control unit 10 of embodiment 2 will be described using FIG. 5. FIG. 5 is a diagram for explaining the processing procedure of the communication control unit according to embodiment 2.

First, when the communication control unit 10 of embodiment 2 receives a notification request for the network connection status from the "TOE/NIC", which is an expansion card, after a network disturbance has occurred (S501 positive), the "unconnected: Link down" information which is the network connection status detected and acquired by the second decoding circuit 12 will be provided to the MDIO of the "TOE/NIC" from the register 15, based on the register address converted by the first decoding circuit 14 (refer to S502 and arrow 3 of FIG. 4C).

Furthermore, when the communication control unit 10 of embodiment 2 receives a network connection status notification request from the "TOE/NIC" after the prescribed period of time designated by the MDC of the "TOE/NIC" (S503), a notification that the network connection status is "connected: Link up" will be provided to the "TOE/NIC", and therefore the register address will be converted to the register address of "status register S Link up", and the information of "connection status: Link up" will be output from the register 15 (refer to arrow 4 of FIG. 4C), thus completing the process.

Effect of Embodiment 2

As described above, with embodiment 1, if the network connection status that is detected by the second decoding circuit 12 and stored in the status maintaining circuit 13 has changed from connected to unconnected, a notification of "unconnected: Link down" will be provided to the "TOE/NIC", and a notification that the network connection information is "connected: Link up" will be provided when requested by the "TOE/NIC" after a prescribed period of time has elapsed, and therefore the "TOE/NIC" will perform temporary packet transmission standby processing and the like during a network disturbance, and will again communicate with the "IPSec card", and therefore the "IPSec card" can be controlled, and a highly reliable encryption processing unit can be achieved.

Embodiment 3

The communication control units of embodiments 1 and 2 have been described above, but this unit can have various alternative forms in addition to the aforementioned embodiments. The various alternative embodiments will be classified as 1 or 2 and described as the communication control units of embodiment 3.

(1) Connection Status

With the aforementioned embodiment 2, the case was described where a notification that the network connection status was "connected" continued to be forcibly provided after temporary notification to the expansion card that the network connection status was "unconnected", but the present unit is not restricted thereby, and for example, if the network connection status acquired from the "PHY" is "unconnected" even after a prescribed fixed period of time has elapsed (for example after five minutes or the like), a notification that the network connection status is "unconnected", or that the network connection status is "connected" can again be provided to the expansion card.

Therefore, even if some time is required until recovery from the network disturbance, the expansion card will again perform temporary packet transmission standby processes, will communicate with the "IPSec card", and can control the "IPSec card", and therefore a highly reliable encryption processing unit can be achieved.

(2) System Construction and the Like

Furthermore, of the processes that were described in the aforementioned embodiments, those processes which were described as being performed automatically can be manually performed in part or in whole, and alternatively, all or a part of the processes that were described as being performed manually can be performed automatically using. For example, the information including process procedures, specific names, types of data, and parameters (such as the cycle for the network connection status notification request from the TOE/NIC) that are shown in the above text and drawings can be freely changed unless specifically noted.

Furthermore, the component elements of each of the units shown are functional schematic elements, and do not necessarily show the physical construction. In other words, the specific forms (for example the form shown in FIG. 2 and the like) of separating or integrating the various processors and memory units are not restricted to those forms that are shown, and for example, the second decoding circuit 12 and the status maintaining circuit 13 can be functionally or physically separated or integrated, in whole or in part, in arbitrary units depending on the various types of loads and conditions of use. Furthermore, the process functions that are performed by each unit can be performed in whole or in part by a CPU or a program that performs analysis using a CPU, and alternatively can be achieved by hardware using wired logic. More particularly, the embodiments can be implemented in computing hardware and/or software. Further, any combinations of the described embodiment functions (processes) can be provided. Further, any combinations of network connection status notices can be provided based upon the actual network connection status and/or determined according to other requirement/criteria regardless of the actual or acquired network connection status, or any combinations thereof.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method of controlling communication for an encryption processing unit that is connected to a network connection status acquiring unit, which is connected to a circuit that transmits packets on a network, and acquires a status of a connection to the network for the encrypting processing unit encrypting the packets, and the encryption processing unit connected to an expansion card for connecting to the network, based on the network connection status requested and acquired from the network connection status acquiring unit by the expansion card each prescribed period of time, the method comprising:
   providing a communication control unit communicably connectable to the encryption processing unit, the network connection status acquiring unit and the expansion card, and that executes:
   relaying by the communication control unit the network connection status acquired from the network connection status acquiring unit to the encryption processing unit;
   forcibly by the communication control unit notifying the expansion card that the network connection status is "connected to network," for a case where the acquired network connection status is "not connected to network" at a time requested by the expansion card; and
   further providing one or more notifications by the communication control unit that include:
   notifying that the network connection status is "connected to network" when power of the encryption processing unit is turned on, for a case where the acquired network connection status is "not connected to network" at a time requested by the expansion card,
   notifying a "not connected to network" status to the expansion card, when the acquired network connection status changes from a "connected to network" status to a "not connected to network" status, and
   notifying the expansion card of network connection information along with a determined network connection status, when requested by the expansion card after a prescribed period of time has elapsed.

2. A communication control unit, which is for an encryption processing unit that is connected to a network connection status acquiring unit, which is connected to a circuit transmitting packets on a network, and acquires a status of a connection to the network for the encryption processing unit encrypting the packets, and the encryption processing unit connected to an expansion card for connecting to the network, based on the network connection status requested and acquired from the network connection status acquiring unit by the expansion card each prescribed period of time, the communication control unit communicably connectable to the encryption processing unit, the network connection status acquiring unit and the expansion card and comprising:
   relay and acquiring means for relaying the network connection status acquired from the network connection status acquiring unit to the encryption processing unit; and
   network connection status notification means for forcibly notifying the expansion card that the network connection status is "connected to network," for a case where the acquired network connection status is "not connected to network" at a time requested by the expansion card,
   wherein the network connection status notification means further provides one or more notifications that include:
   notifying that the network connection status is "connected to network" when power of the encryption processing unit is turned on, for a case where the acquired network connection status is "not connected to network" at a time requested by the expansion card,
   notifying a "not connected to network" status to the expansion card, when the acquired network connection status changes from a "connected to network" status to a "not connected to network" status, and
   notifying the expansion card of network connection information along with a determined network connection status, when requested by the expansion card after a prescribed period of time has elapsed.

3. A communication device, comprising:
   an encryption processor encrypting packets;
   a network connection status acquirer communicably connected to the encryption processor and to a circuit transmitting packets on a network, and acquiring from the circuit a status of a connection to the network for the encryption processor encrypting the packets;
   an expansion card communicably connected to the encryption processor and connecting to the network, based on the network connection status requested and acquired from the network connection status acquirer by the expansion card each prescribed period of time; and
   a communication controller
      relaying the network connection status acquired from the network connection status acquirer to the encryption processor, and
      forcibly notifying the expansion card that the network connection status "is connected to network," when the acquired network connection status is "not connected to network" at a time requested by the expansion card,
      wherein further one or more notifications are provided that include:
         notifying that the network connection status is "connected to network" when power of the encryption processer is turned on, for a case where the acquired network connection status is "not connected to network" at a time requested by the expansion card,
         notifying a "not connected to network" status to the expansion card, when the acquired network connection status changes from a "connected to network" status to a "not connected to network" status, and
         notifying the expansion card of network connection information along with a determined network connection status, when requested by the expansion card after a prescribed period of time has elapsed.

4. A communication controller, which is for an encryption processor, that is connected to a network connection status acquirer, which is connected to a circuit transmitting packets on a network, and acquires a status of a connection to the network for the encryption processor encrypting the packets, and the encryption processor connected to an expansion card for connecting to the network, based on the network connection status requested and acquired from the network connection status acquirer by the expansion card each prescribed period of time, the communication controller communicably connectable to the encryption processor, the network connection status acquirer and the expansion card and comprising:

a controller
- relaying the network connection status acquired from the network connection status acquirer to the encryption processor, and acquiring the network connection status from the network connection status acquirer, and
- forcibly notifying the expansion card that the network connection status is "connected to network," when the acquired network connection status is "not connected to network" at a time requested by the expansion card,
- wherein further one or more notifications are provided that include: notifying that the network connection status is "connected to network" when power of the encryption processor is turned on, for a case where the acquired network connection status is "not connected to network" at a time requested by the expansion card,
- notifying a "not connected to network" status to the expansion card, when the acquired network connection status changes from a "connected to network" status to a "not connected to network" status, and
- notifying the expansion card of network connection information along with a determined network connection status, when requested by the expansion card after a prescribed period of time has elapsed.

\* \* \* \* \*